Patented May 28, 1946

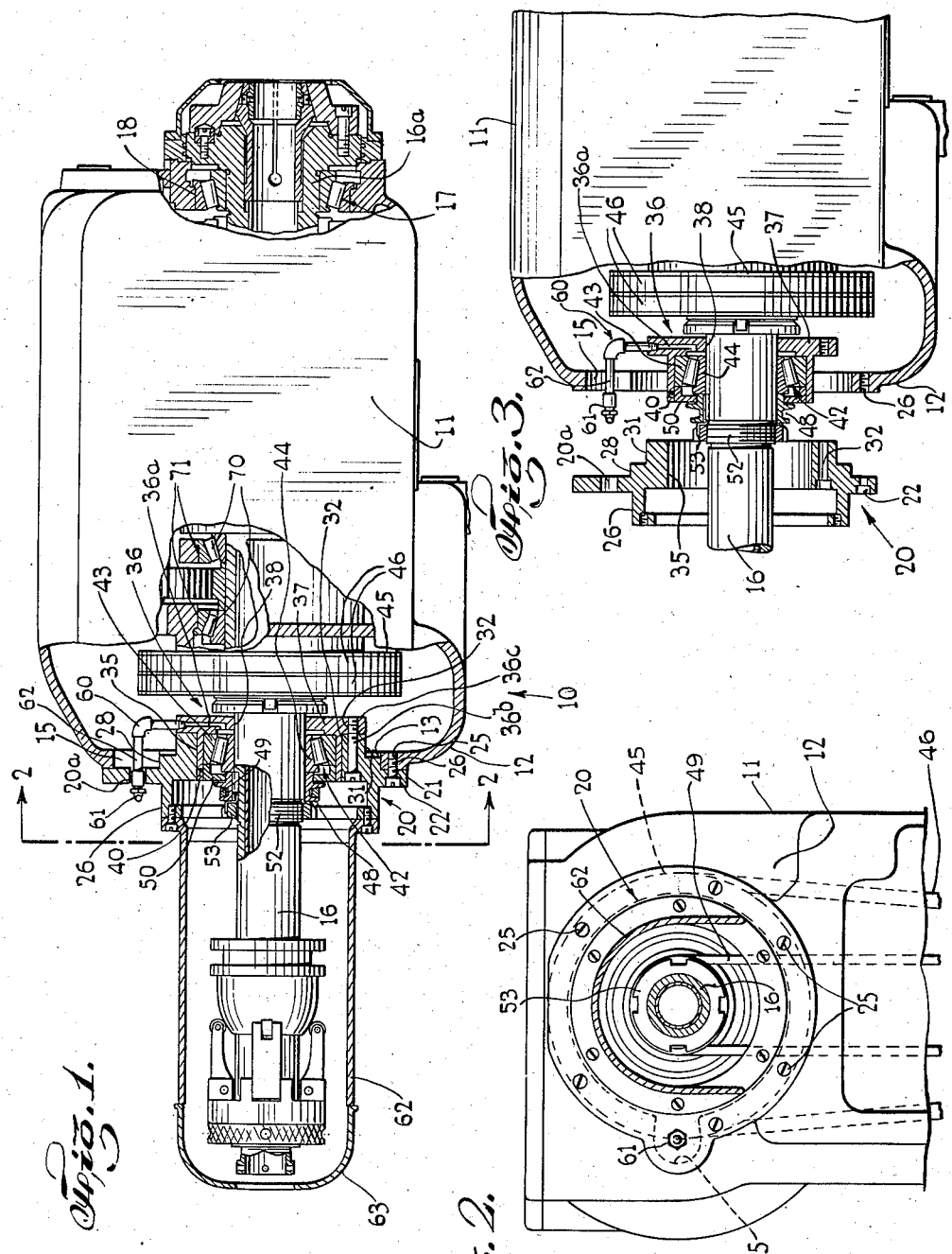

2,401,072

UNITED STATES PATENT OFFICE 2,401,072

TURRET LATHE HEADSTOCK

Morris G. Himoff, New York, N. Y., assignor to Morey Machinery Co., Inc., New York, N. Y., a corporation Application May 21, 1943, Serial No. 487,886

2 Claims. (Cl. 82—28)

This invention relates to turret lathe headstocks, and is particularly directed to the rear spindle bearing assembly and the like mechanism.

An object of this invention is to provide a highly improved spindle bearing assembly so constructed as to permit removal of the cover from the spindle opening at the rear of the headstock casing without disassembling the bearing or tempering with the take-up nut which adjusts the spindle bearings, while permitting access to the interior of the headstock for replacing the motor drive belts, or for the like purposes.

A further object of this invention is to provide a highly improved spindle support at the rear spindle opening of the headstock which shall reduce machining costs of the headstock casing, which shall be easy to assemble, relatively inexpensive to manufacture, and withall practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a top plan view of a headstock of a turret lathe, with parts broken away and in cross-section, and illustrating a spindle support assembly embodying the invention;

Fig. 2 is a cross-sectional view taken on line 2—2 of Fig. 1; and

Fig. 3 is a view similar to Fig. 1 but showing the headstock rear spindle opening cover removed.

Referring now in detail to the drawing, 10 designates a headstock of a turret lathe embodying the invention, and 11 designates the headstock casing. Said casing has a rear wall 12 formed with an annular rear spindle opening 13. Said opening 13 has an offset extension or notch 15 for the purpose hereinafter appearing. Extending through said opening 13, axially thereof, is the spindle 16. The front end 16a of said spindle is supported on a roller bearing 17 carried within an opening 18 in the housing 11.

Mounted within opening 13 is a cover 20 having a flange 21 contacting the outer side of the back wall 12 at said opening, and formed with drilled and counterbored openings 22. Passing through openings 22 are screws 25 screwed into openings 26 in the rear wall 12 for attaching the rear cover to said rear wall. Said cover 20 is formed with a rearwardly extending portion 26 of inverted U-shape, and with an annular shoulder 28 fitted within the opening 13. Extending forwardly from the cover 20 is a cylindrical wall 31 formed with a plurality of spaced, drilled and counterbored openings 32. Said cover 20 comprises a ring, and is formed with a central cylindrical opening 35, larger than the spindle and concentric therewith.

Fitted within the cylindrical opening 35 is a cartridge 36 having a circular wall 37 formed with a central opening 38 through which the spindle 16 passes. Said cartridge 36 is also formed with a cylindrical wall 40 received within opening 35 of the back cover 20.

The cartridge 36 is fixed to the cover 20 by means of screws 36b passing through the drilled and counterbored openings 32 and screwed within screw threaded openings 36b in the rear wall of the cartridge.

Within the cartridge is a roller bearing 42 supporting spindle 16, and comprising a cup 43 and a cone 44. The bearing 42 tapers oppositely to the bearing 17.

On the spindle and within the casing 11 is a pulley 45 driven by belts 46 which extend down to a motor in the base of the machine. On said spindle and keyed thereto, and disposed on the outer side of the cone bearing, is a pulley 48 carrying a belt 49 extending down to a speed box, not shown.

A bearing cover 50 may be provided to close the rear of the bearing 42 as shown in the drawing. The spindle 16 is provided with an external screw threaded portion 52 receiving a take-up nut 53. Upon turning the nut 53, pressure is exerted on the bearings 17 and 42 to adjust said bearings. It will be noted that when the nut is turned the spindle will be urged to the left to exert pressure on the bearing 17 while the nut presses against pulley 48 and hence against the bearing 42 causing pressure to be exerted on cartridge 36 which is attached to the rear cover 20, said rear cover being in turn attached to the rear of the headstock casing. The cartridge 36 may be provided with an oil passage 36a and fixed to the mouth of said passage is an oil pipe 60 which passes through the notched opening 15 in the rear wall of the headstock, and through an opening 20a in the rear cover 20. At the outer end 72 of pipe 60 is an oiler 61.

Attached to portion 26 of rear cover 20 is a spindle cover 62 of usual construction and hinged thereto is a spindle guard likewise of usual construction.

It will now be understood that the cover 20 may be removed by removing the screws 25 and 36b as illustrated in Fig. 3 of the drawing. Access may then be had to the belts 46 which can then be removed and replaced through the space between the cartridge and the inner edge of the opening 13 in the headstock. Upon removing the rear cover 20 the bearing assembly is not disturbed and the take-up nut likewise is undisturbed, so that the adjustment of the bearings will not vary when the rear cover is reattached to the cartridge.

It will be noted that the opening 35 in the rear cover is sufficiently large so as to permit the rear cover to be taken off the rear end of the spindle without necessity for disassembling the spindle.

It will be further noted that the rear spindle support is directly on the rear wall of the headstock casing and that the cover opening 13 in said casing is relatively easy to machine to desired tolerances. The bearing is furthermore easy to assemble and disassemble.

The spindle is supported on additional bearings 70 carried by the headstock casing and located within the hole 71 of the headstock casing 11 and between the front and rear walls thereof. With such construction the spindle is supported in horizontal position when the cover 20 is detached from the casing and cartridge.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. In a headstock, a casing, a spindle, a bearing on said casing supporting the front end of the spindle, said headstock casing having a rear wall formed with an opening, a rear cover fixed to the rear wall at said opening, said cover having an opening smaller than the opening in said rear wall, a cartridge fixed to said rear cover and fitted into the opening in said cover, a roller bearing on said spindle and within said cartridge, a nut on the spindle adapted to adjust said bearings, and a pulley on said spindle and within said casing and adjacent the rear wall of said casing.

2. In combination, a headstock casing having a front wall and a rear wall, said front and rear walls being formed with aligned openings, a spindle extending through the headstock and passing through said openings, a bearing on the spindle supported in the opening of the front wall of said headstock casing, a cover for said opening in the rear wall of the casing, means to attach the cover to said rear wall, said cover being formed with a cylindrical wall, a cartridge having a cylindrical wall fitted within the cylindrical wall of the cover, said cartridge having an annular end wall formed with a central opening through which the spindle passes, and an annular flange contacting the inner edge of the cylindrical wall of the cover, means passing through the cylindrical wall of the cover and the annular flange of the cartridge to attach said cartridge to said cover, a second bearing on said spindle and within the cylindrical wall of said cartridge, said spindle being formed with a screw threaded portion on the outside of the casing, and a nut on said screw threaded portion adapted to adjust both said bearings, said cartridge being of less diameter than the opening in the rear wall of said headstock to provide a space between the cartridge and the opening in said rear wall when the cover is detached from said rear wall and cartridge, and a pulley on said spindle and within said casing and adjacent the rear wall of said casing.

MORRIS G. HIMOFF.